(12) United States Patent
Kessler

(10) Patent No.: US 8,638,453 B2
(45) Date of Patent: Jan. 28, 2014

(54) PIPE DIAMETER MEASUREMENT DEVICE

(75) Inventor: Peter Kessler, Hirschegg (AT)

(73) Assignee: Envirosight LLC, Randolph, NJ (US)

( * ) Notice: Subject to any disclaimer, the term of this patent is extended or adjusted under 35 U.S.C. 154(b) by 0 days.

(21) Appl. No.: 13/410,761

(22) Filed: Mar. 2, 2012

(65) Prior Publication Data
US 2012/0224189 A1 Sep. 6, 2012

Related U.S. Application Data

(60) Provisional application No. 61/448,523, filed on Mar. 2, 2011.

(51) Int. Cl.
*G01B 11/02* (2006.01)

(52) U.S. Cl.
USPC .......................................... 356/635; 356/625

(58) Field of Classification Search
USPC ................. 356/625–640; 33/501, 555.1, 555, 33/556–558, 542, 544, 544.2, 302; 250/559.19, 559.24, 268; 348/84, 85
See application file for complete search history.

(56) References Cited

U.S. PATENT DOCUMENTS

| | | | |
|---|---|---|---|
| 6,651,351 B1 * | 11/2003 | Christoph et al. | 33/503 |
| 7,903,245 B2 * | 3/2011 | Miousset et al. | 356/241.1 |
| 2005/0005467 A1 * | 1/2005 | Hannel | 33/542 |

* cited by examiner

*Primary Examiner* — Tri T Ton
(74) *Attorney, Agent, or Firm* — Saul Ewing LLC

(57) ABSTRACT

A measurement system comprising an elongated member, a distal member connected to an end of the elongated member, the distal member having one or more register members to define a reference point(s), and a beam measurement device mounted to the distal member and configured to generate a beam at least a portion of the beam having a first axis essentially perpendicular to the reference point(s), the beam measurement device determining distance data based on the reflection of at least a portion of the beam.

19 Claims, 5 Drawing Sheets

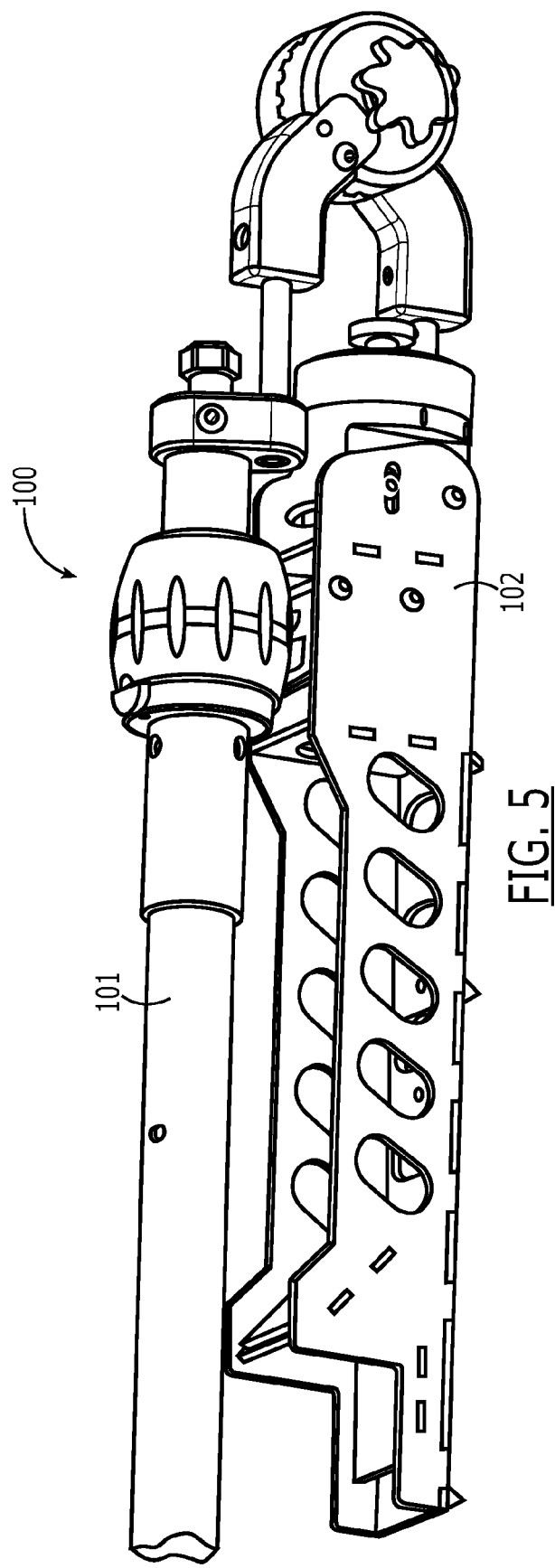

PIPE DIAMETER MEASUREMENT DEVICE

REFERENCE TO RELATED CASE

This application claims priority to U.S. Provisional Application No. 61/448,523, filed Mar. 2, 2012, hereby incorporated by reference in its entirety.

FIELD OF INVENTION

The present invention relates generally to a device for remotely measuring the diameter of pipes, and more specifically, to a device configured to measure the diameter of underground municipal pipes through a manhole.

BACKGROUND

In a traditional municipal infrastructure, a sewer system includes, among other elements, a network of manholes interconnected by a series of lateral pipes. Recently, in Europe, North America and elsewhere, regulations require not only inspecting municipal pipes, but also documenting them with respect to the depth and diameter of the manhole, and the number and size of lateral pipes extending from the manholes. Measuring the depth and diameter of a manhole is a relatively easy and straightforward operation. The worker simply removes the manhole cover, measures the diameter of the opening, and lowers a measuring tape down the manhole to determine its depth. Measuring lateral pipes, however, tends to be more difficult. Traditionally, a person would have to be lowered or climb down into the manhole and measure the opening of the lateral pipe at the manhole with a tape measurer or similar instrument.

This approach has a number of drawbacks. First, climbing into a manhole tends to be dangerous as sewer gases and other toxic fumes pose a serious health threat, and can be deadly if proper precautions are not taken. Additionally, climbing into a confined space containing sewage is obviously objectionable. Furthermore, attempting to measure the laterals in this way tends to be unreliable. Specifically, frequently the lateral opening at the manhole is corrupted to the point that it does not provide a reliable indication of the diameter of the pipe. This corruption may be a result of, for example, cracking or damage at the seam between the manhole and the lateral, a repair job using a bulky patch, or just the seam in general that distorts the opening to the lateral such that measuring the opening does not provide a reliable indication of the actual diameter of the lateral pipe further down. Finally, physically measuring the opening of the lateral may be impractical because lateral pipes are often at the bottom of the manhole or underwater, making observations of a tape measurer or other measuring device difficult if not impossible. Therefore, measuring the opening of a lateral at the manhole junction tends to be dangerous and inconvenient, and frequently provides an unreliable indication of the lateral pipe's diameter.

Therefore, applicant has identified the need to be able to measure lateral pipes reliably without entering a manhole. The present invention fulfills this need, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a measurement system having a device on an elongated pole that is configured to be inserted into a lateral pipe, beyond the opening of the manhole, and to register itself against the inner wall of the lateral pipe to facilitate its measurement of the diameter of the lateral pipe.

In one embodiment, the system comprises: (a) an elongated member; (b) a distal member connected to an end of the elongated member, the distal member having one or more register members to define a reference point(s); and (c) a beam measurement device mounted to the distal member and configured to generate a beam at least a portion of the beam having a first axis essentially perpendicular to the reference point(s), the beam measurement device determining distance data based on the reflection of at least a portion of the beam.

The present invention also relates to a method of using the system to measure the diameter of a lateral pipe. In one embodiment, the method comprises: (a) inserting the elongated member into a manhole; (b) inserting the distal member in a lateral pipe extending from the manhole; (c) moving the elongated member such that the register member contacts the inner wall of the lateral pipe; and (d) using the beam measurement device to calculate the diameter of the lateral pipe.

Aside from the subject matter discussed above, the present disclosure includes a number of other exemplary features such as those explained hereinafter. It is to be understood that both the foregoing description and the following description are exemplary only.

BRIEF SUMMARY OF DRAWINGS

FIG. 5 shows the measuring device of FIG. 1 in a collapsed configuration.

DETAILED DESCRIPTION

Figure 1:
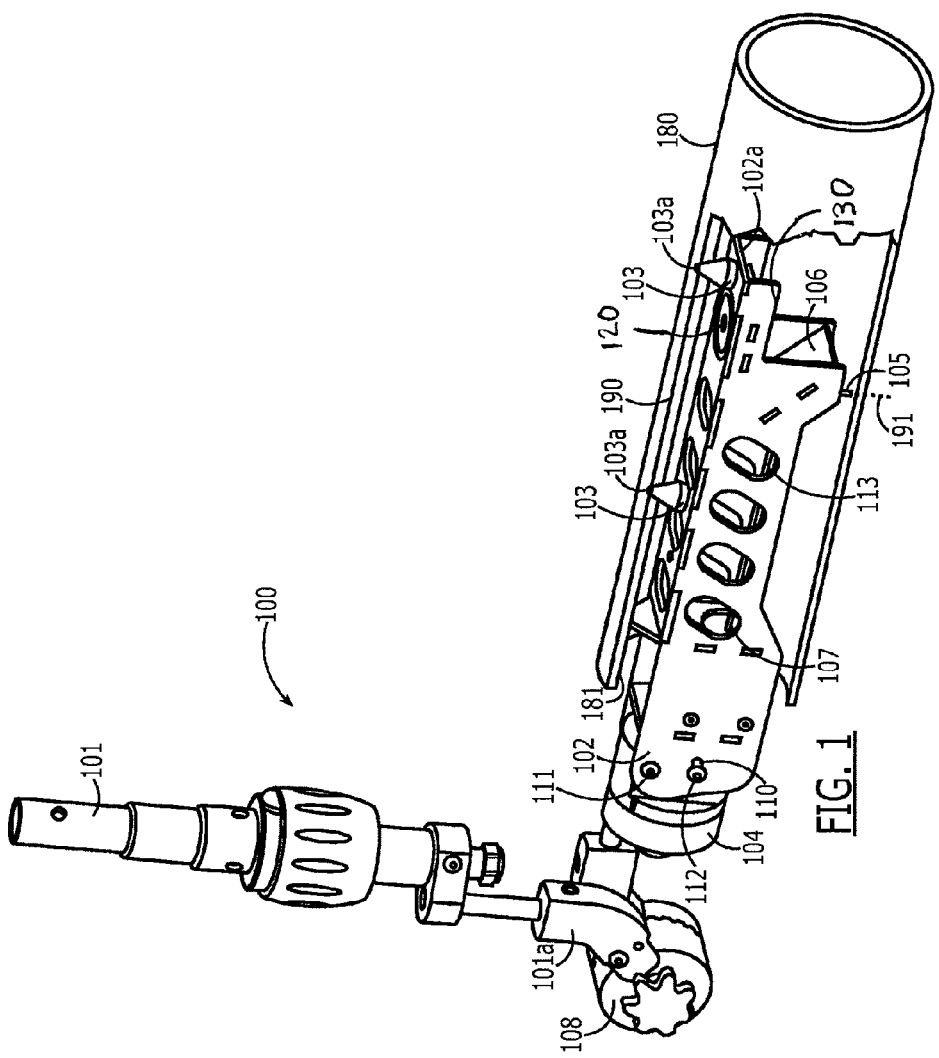
FIG. 1 shows one embodiment of the present invention with a measuring device of the present invention with the distal member inserted into a lateral pipe.
Figure 2:
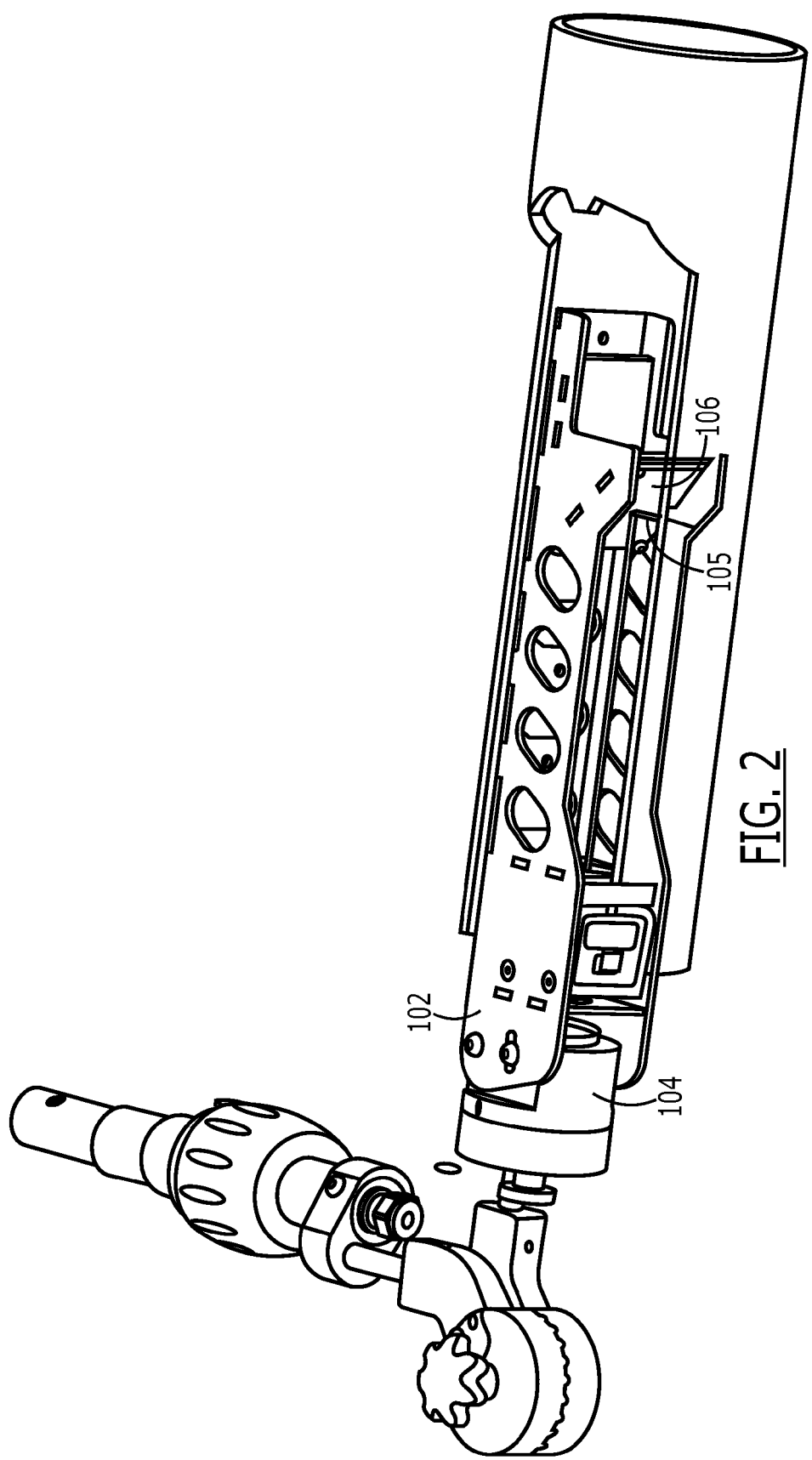
FIG. 2 shows a more of a bottom view of the embodiment of FIG. 1.
Figure 3:
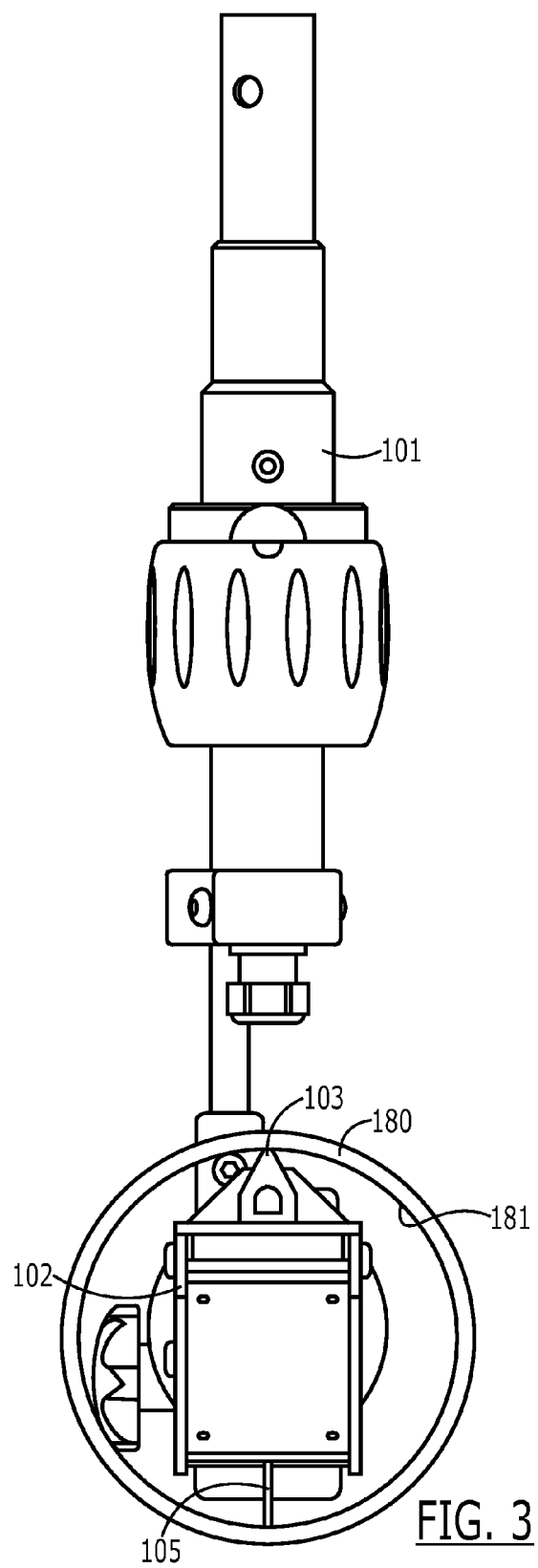
FIG. 3 shows a head-on view of the embodiment of FIG. 1.

Referring to FIG. 1, a system 100 for measuring pipe diameters is shown. The system 100 comprises an elongated member 101 and a distal member 102 connected to an end 101*a* of the elongated member 101. The distal member 102 has one or more register members 103 to define at least one reference point(s) 190 (shown in dotted line). (It should be noted that the reference point(s) may be a single point, or a line or an entire plane defined by multiple points. In this embodiment, a plurality of members 103 have points 103*a* (described below) which align to define a plurality of reference point(s) 190 to form a line.) The distal member 102 also comprises a beam measuring device 104 mounted to the distal member 102 and configured to generate a beam 105, at least a portion of the beam 105 having a first axis 191 essentially perpendicular to the reference point(s) 190. The device 104 provides distance data based at least a portion of the beam 105 being reflected by the inside of a pipe. The elements of the system 100 are considered in greater detail below.

The elongated member 101 functions to maneuver the distal member 102 into the lateral pipe. To this end, the elongated member is of sufficient length to extend from the top of a manhole down to a lateral pipe in a typical municipal sewer system. Such lengths may vary, although typically such lengths range from five feet to thirty feet. To accommodate the varying lengths, the elongated member may be configured as an assembly of telescoping poles, or an assembly of snap together pole segments. Still other embodiments of the elongated member are possible within the scope of the claims.

In one embodiment, the end 101a of the elongated member 101 comprises an adjustable connector 108. In one embodiment, the adjustable connector 108 functions to enable the angle of the distal member 102 to be adjusted relative to the elongated member 101. For example, as shown in FIG. 1, the adjustable connector 108 may be configured to hold the distal member 102 at essentially a perpendicular angle to the elongated member 101. Such an angle is typically preferred when measuring the lateral pipes. However, when the device is not in use and is being stored or transported, it may be preferable to collapse the system 100 such that the distal member 102 folds up against the elongated member 101 as shown in FIG. 5.

In addition to adjusting the angle of the distal member 102 with the elongated member 101 as described above, in some embodiments, it may be preferable for the adjustable connector to be configured to adjust the distal member 102 along another axis. For example, it may be preferable to rotate the distal member 102 such that the first axis 191 is perpendicular to the elongated member 101 to enable horizontal measurement as described below.

Mechanisms for allowing the relative position of the distal member 102 to be adjusted relative to the elongated member 101 are known in the art and include, for example, a simple clamping assembly 108 as shown in FIG. 1. In the embodiment in which the distal member 102 rotates to change the angle of the first axis to the elongated member as described above, it may be preferable to have the bracket adjustable in ninety degree increments (rather than one which is continuously/variably adjustable) such that the position of the first axis to the elongated member is either perpendicular or parallel to the elongated member. Still other adjustment mechanisms will be obvious to one of skill in the art.

In one embodiment, the end 102a of the distal member 102 is biased upward to facilitate contact of the register members with the inside wall 181 of the pipe 180. More specifically, having the end 102a biased upward enables the user to insert the distal member 102 into the lateral pipe as shown in FIG. 1, and then pull up on the elongated member 101 such that the register member 103 closest to the end 102a contacts the inner wall 181 first, followed by the second register member 103, thereby signaling to the user that contact of both register members to the inside wall has been successfully achieved.

Configurations for biasing the end 102a upward are known in the art in light of this disclosure. For example, in FIG. 1, a resilient member (e.g., spring (not shown)) either pulls or pushes the end 102a of the distal member upward. To facilitate this motion, a slot 110 is provided around fastener 112 to enable the distal member 102 to pivot around fastener 111 as shown in FIG. 1.

In one embodiment, the device is configured with modular components which can be quickly disassembled and reassembled. For example, referring to FIG. 4, a view of the end 101a of the elongated member 101 dissembled is shown. In this embodiment, a nut 402 is configured to interengage threads 403 to join the end 101a to the body 101b of the elongated member 101.

Figure 4:
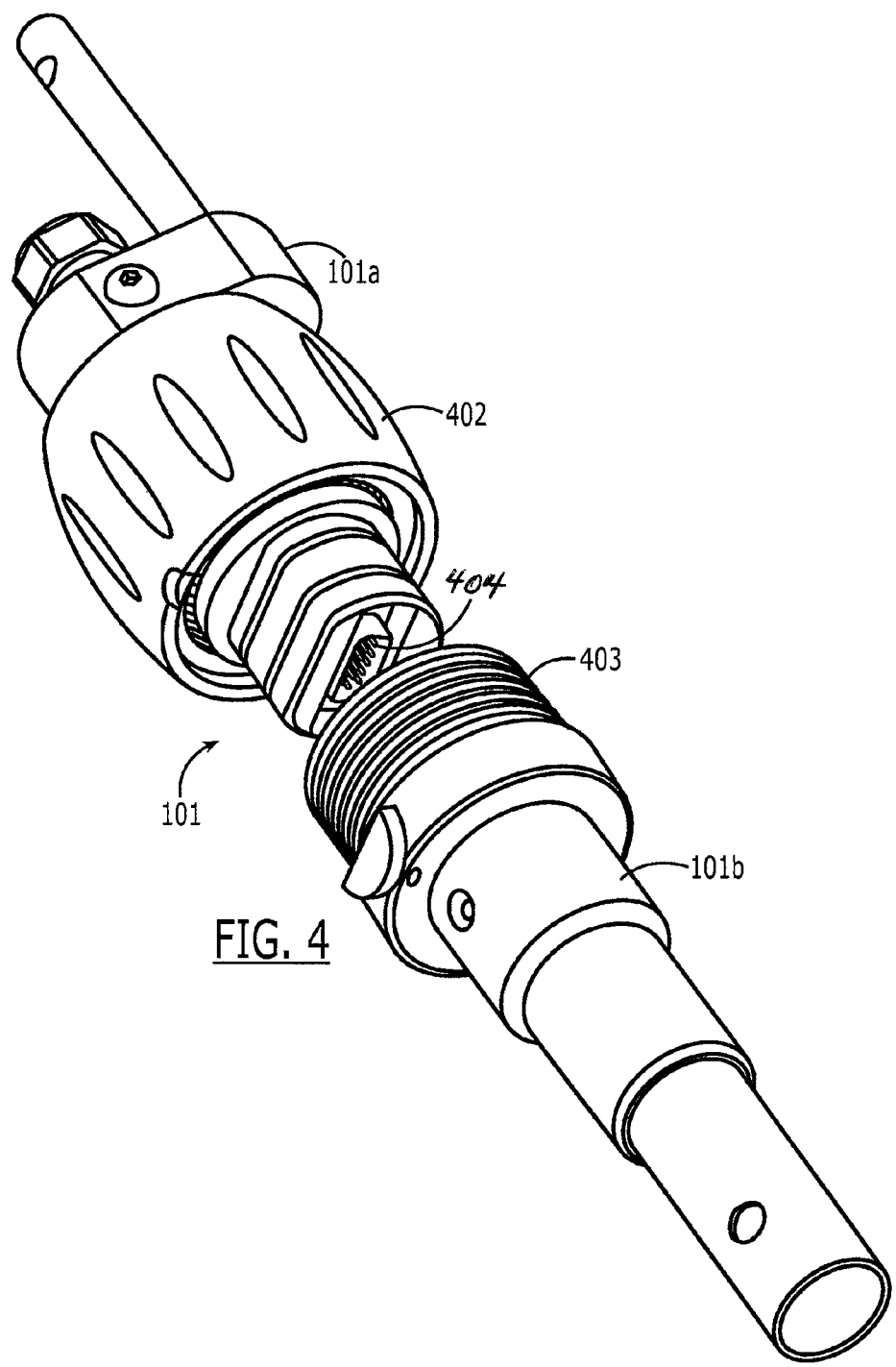
FIG. 4 shows one embodiment of the quick connect in the elongated member of the measuring device of FIG. 1.

In one embodiment, to further facilitate the modularity of the different components, electrical or optical conduit is run on the inside of the elongated member and distal member to avoid exposing cabling, which runs the risk of be snagged or otherwise being damaged by harsh environmental conditions. To this end, in one embodiment, the various components involve quick electrical connections 404 as shown in FIG. 4. Such connections allow the components to literally be snapped together and screwed in place, thereby achieving both mechanical and electrical connection in one easy step.

Considering now the distal member in greater detail, it functions to align the measuring beam within a pipe to ensure it is essentially normal to the inner wall 181 of the lateral pipe 180, thereby ensuring that the distance reading is actually the diameter of the pipe. To this end, the distal member uses register members 103 to define at least one reference point(s) 190 (shown in phantom line in FIG. 1). It further ensures that the first axis 191 of the measurement beam 105 is perpendicular to the reference point(s) 190. This way, when the inside wall 191 of the lateral pipe 180 is coincident with the reference point(s) 190, the measuring beam 105 will be positioned along the diameter of the lateral pipe 180.

The reference point(s) is either a real or imaginary surface defined by the register member(s). Because lateral pipes are round, the reference point(s) should be relatively thin and resemble more of a line than a broad surface because a broad surface would not be able to seat properly on the inside curve of a pipe. In one embodiment, the register members 103 comprise protrusions extending upward from the distal member 102 as shown in FIG. 1. The tips 103a of the protrusion define an reference point(s) 190 in the form of an imaginary line therebetween as shown.

Using pointy tips 103a to define the reference point(s) 190 is generally preferred because often times the inner wall 181 of lateral pipes 180 comprises a layer of debris or slime build up that needs to be penetrated to reach the inner wall 181. The pointy tips 103a as shown in FIG. 1 are configured to pierce this build up and reach the inner wall 181. Although protrusions with pointy tips 103a are generally preferred, other configurations of a registered member can be used. For example, a sharp edge could be used instead to define the reference point(s), which would be in the form of a line. Additionally, more than two protrusions can be used.

The beam measurement device 104 of the distal member 102 may be any device capable to measuring a distance using a propagating beam. Suitable measuring devices include, for example, electromagnetic devices such as radar and infrared beams, sonic devices such as sonar, and coherent beams such as lasers. Due to their commercial availability, low cost and accuracy, laser distance finders are generally preferred.

Associated with the measuring device typically is some kind of computer or processer (not shown) to convert the data into a distance measurement, and to store or output that measurement data. Such circuitry can be integrated into the measuring device 104 itself, or alternatively, it may be transmitted to a discreet device near the user. In one embodiment, the system comprises a USB, wireless, or similar interface to transmit the stored measurement data to a computer or other device.

Referring back to FIG. 1, the measuring device 104 is configured to transmit a beam 105. At least a portion of the beam 105 is essentially perpendicular to the reference point(s) 190. There are different configurations to facilitate this. For example, as shown in FIG. 1, the measuring device 104 is secured near the end 101a of the elongated member 101 such that it has an initial beam 107 that runs essentially parallel to the reference point(s) 190. A mirror 106 mounted near end 102a, turns the initial beam 107 at a right angle such that the beam 105 has a first axis 191 perpendicular to the reference point(s) 190 as described above.

There are number of benefits in having a compound beam as shown in FIG. 1. First, laser measuring devices configured to measure longer distances tend to be more accurate and more commercially available. Furthermore, by using a compound beam and extending the length of the beam through light bending, the distance range capability of the commercial available laser devices increases dramatically such that the same laser measuring device can be used to measure not only the diameter of a lateral pipe, but also the depth of the manhole. Therefore, by configuring the device such that an initial beam 107 runs along the length of the distal member 102 before being reflected perpendicular to the reference point(s) 190, length is added to the laser path, thereby allowing commercially available and versatile laser devices to be used.

Additionally, the compound beam configuration of FIG. 1 also has the synergistic advantage of increasing the offset of the first axis 191 from the elongated member. This allows the distal member to be inserted further down the lateral pipe to take the measurement. As mentioned above, measuring down the lateral pipe offers significant benefits and is significantly more reliable than the measuring at the opening of the lateral pipe at the manhole. Therefore, by having the compound beam as shown in FIG. 1, the distal member 102 is elongated allowing a measurement to be taken further down the lateral pipe.

The distal member may also have additional optional features. For example, in one embodiment, the distal member comprises a bull's eye level 120 as shown in FIG. 1. Such a level may be advantageous when dimensions are being measured for the manhole. That is, in addition to measuring lateral diameters, often it is necessary to measure the depth of the manhole as mentioned above. To measure the depth of the manhole, it is important that the distal member 102 be essentially level in both horizontal axes. To this end, the bull's eye level 120 can be used to ensure that the distal member 102 is level such that the beam 105 is normal to be bottom of the manhole to ensure an accurate reading of the depth of the manhole.

Another additional feature might be a light mounted near or about end 101a of the elongated member 101. Such a light may be useful in locating and positioning the distal member 102 in the lateral pipes.

In another embodiment, at or near the end 101a of the elongated member 101a, a gas sensor may be mounted to detect levels of potentially hazardous gases.

In yet another embodiment, the connector 108 may be associated with a resolver or other device known to provide an indication of the angle between the distal member 102 and the elongated member 101. Such an angle may be important to know to document the grade of a lateral pipe extending away from the manhole.

Additionally, in other embodiments, the distal member 102 is lightened by removal of material 113 as shown in FIG. 1, thereby improving its maneuverability. Additionally, in another embodiment, a right angle notch 130 is defined at the end 102a of the distal member 102. Such a notch is useful in seating the distal member along the edge of a manhole when measuring the depth of the manhole as described above. Still other embodiments and modifications to the device of the present invention will be obvious to one of skill in the art in light of this disclosure.

As mentioned above, the device of the present invention facilitates measuring pipe diameters without entering the manhole. In the one embodiment, the process involves inserting the elongated member 101 into a manhole, inserting the distal member in a lateral pipe extending from the manhole; and then moving the device such that the register member contacts the inner wall of the lateral pipe. At this point, the distance calculating device can be used to calculate the diameter of the lateral pipe.

As mentioned above, there may be situations where water or other debris at the bottom of the lateral pipes prevents measuring the diameter vertically. In such cases, in one embodiment, the system 100 comprises an adjustable connector allowing the distal member 102 to be rotated such that the first axis of the measuring beam is essentially perpendicular to the elongated member 101. In such a configuration, the distal device may be inserted into the lateral pipe and moved sideways (or horizontally) until the register members 103 contact the inner wall 181 of the lateral pipe 180 to align the distal member 102 therein. At this point, the diameter of the lateral pipe may be measured horizontally rather than vertically thus avoiding any debris or water at the bottom of the lateral pipe.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A measurement system comprising:
   an elongated member;
   a distal member connected to an end of said elongated member, said distal member having one or more register members defining two or more reference points which define a reference line; and
   a beam measurement device mounted to said distal member and configured to generate a beam at least a portion of said beam having a first axis essentially perpendicular to said reference line, said beam measurement device determining distance data based on the reflection of at least a portion of said beam.

2. The system of claim 1, wherein said beam is one of a laser beam, electromagnetic beam, or a sonic beam.

3. The system of claim 1, wherein said end comprises a configurable connector, said configurable connector adapted to hold said distal member is various positions relative to said elongated member.

4. The system of claim 3, wherein said connector is adapted to move said distal member in two perpendicular axes relative to said elongated member.

5. The system of claim 1, wherein said end comprises a configurable connector, said connector comprises a resilient member to bias said distal member upward at its end.

6. The system of claim 1, wherein said elongated member is a telescoping pole.

7. The system of claim 1, further comprising a mirror mounted to said distal member, said beam measurement device mounted to project a beam down said distal member parallel to said reference point(s) and incident on said mirror such that said beam is reflected along said first axis.

8. The system of claim 7, wherein said pole defines a second axis, said first and second axis being offset by a certain distance.

9. The system of claim 8, wherein said certain distance is at least 7 inches.

10. The system of claim 1, wherein said register member comprises two or more protrusions extending outward from said distal member, at least two protrusions having a point along said reference line.

11. The system of claim 1, wherein said register member comprises an edge protruding outward from said distal member and lying in said reference line.

12. The system of claim 1, further comprising a bull's-eye level on said distal member.

13. The system of claim 12, wherein said distal member comprises a right angle profile at its end configured to seat against an edge of a manhole opening to position the first axis essentially vertically in said manhole.

14. The system of claim 1, further comprising a lamp mounted at or near said end of said elongated member to illuminate said area around said distal member.

15. The system of claim 1, further comprising a gas sensor mounted near or at said end to detect harmful gases.

16. A method of using the system recited in claim 1 to measure the diameter of a lateral pipe, said method comprising:

inserting said elongated member into a manhole;

inserting said distal member in a lateral pipe extending from said manhole;

moving said elongated member such that said one or more register members contact the inner wall of said lateral pipe;

using said beam measurement device to calculate the diameter of said lateral pipe.

17. The method of claim 1, wherein said moving said elongated member comprises raising said elongated member such that said one or more register members contact the top of the lateral pipe.

18. The method of claim 1, wherein said connector is configured such that said first axis is essentially perpendicular to elongated member, and wherein moving said elongated member comprises moving said elongated member horizontally.

19. The method of claim 1, wherein inserting said distal member into said lateral pipe comprises moving said first axis down said lateral pipe at least 6 inches.

\* \* \* \* \*